(12) United States Patent
Lee et al.

(10) Patent No.: US 8,176,423 B2
(45) Date of Patent: May 8, 2012

(54) METHOD AND APPARATUS FOR PLAYING MULTIMEDIA CONTENTS

(75) Inventors: Lye-suk Lee, Seoul (KR); Jin-hee Kim, Yongin-si (KR); Hwan-joon Choi, Bucheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1210 days.

(21) Appl. No.: 11/484,646

(22) Filed: Jul. 12, 2006

(65) Prior Publication Data

US 2007/0130543 A1     Jun. 7, 2007

(30) Foreign Application Priority Data

Dec. 1, 2005   (KR) .................. 10-2005-0116470

(51) Int. Cl.
*G06F 3/00* (2006.01)
(52) U.S. Cl. .............. 715/716; 715/810; 715/841
(58) Field of Classification Search ............. 715/810, 715/841, 835, 716
See application file for complete search history.

(56) References Cited

U.S. PATENT DOCUMENTS

| | | | | |
|---|---|---|---|---|
| 5,671,225 A * | 9/1997 | Hooper et al. | ............ | 370/468 |
| 6,005,861 A * | 12/1999 | Humpleman | ............ | 370/352 |
| 6,118,445 A * | 9/2000 | Nonomura et al. | ............ | 715/723 |
| 6,317,781 B1 * | 11/2001 | De Boor et al. | ............ | 709/217 |
| 6,363,434 B1 * | 3/2002 | Eytchison | ............ | 719/313 |
| 7,038,581 B2 * | 5/2006 | Kendall et al. | ............ | 340/506 |
| 7,697,824 B2 | 4/2010 | Shimoda et al. | | |
| 2003/0046437 A1 * | 3/2003 | Eytchison et al. | ............ | 709/250 |
| 2005/0259976 A1 | 11/2005 | Shimoda et al. | | |

FOREIGN PATENT DOCUMENTS

| | | |
|---|---|---|
| CN | 1571497 A | 1/2005 |
| JP | 11-296534 A | 10/1999 |
| JP | 2001-292407 A | 10/2001 |
| JP | 2004-282114 A | 10/2004 |
| JP | 2005-93057 A | 4/2005 |
| JP | 2005-260511 A | 9/2005 |
| JP | 2005-322285 A | 11/2005 |
| KR | 10-2004-0033766 A | 4/2004 |
| KR | 10-2004-0055087 A | 6/2004 |
| WO | 2005/036875 A1 | 4/2005 |

* cited by examiner

*Primary Examiner* — Chat Do
*Assistant Examiner* — Phenuel Salomon
(74) *Attorney, Agent, or Firm* — Sughrue Mion, PLLC

(57) ABSTRACT

A method and an apparatus for playing multimedia contents are provided. The method includes if a multimedia contents file providing the multimedia contents is loaded, detecting contents menus for controlling the multimedia contents from the multimedia contents file and displaying the contents menus; and if a specific contents menu is selected from the contents menus, providing a contents service corresponding to the selected contents menu.

17 Claims, 5 Drawing Sheets

METHOD AND APPARATUS FOR PLAYING MULTIMEDIA CONTENTS

CROSS-REFERENCE TO RELATED APPLICATIONS

This application claims priority from Korean Patent Application No. 10-2005-0116470 filed Dec. 1, 2005, in the Korean Intellectual Property Office, the disclosure of which is incorporated herein by reference.

BACKGROUND OF THE INVENTION

1. Field of the Invention

Apparatuses and methods consistent the present invention relate to playing multimedia contents, and more particularly, to providing various menus during playing of the multimedia contents.

2. Description of the Related Art

Multimedia contents services have been provided in various ways with the development of digital technology. In particular, multimedia contents are provided through streaming services or download services online.

Streaming services play moving pictures corresponding to multimedia contents files in real-time while downloading of the multimedia contents files. The download services play moving pictures corresponding to multimedia contents files after the multimedia contents files are completely downloaded.

The multimedia contents files include metadata briefly describing media data for playing moving pictures and the moving pictures. The metadata includes brief information relating to the moving pictures, for example, titles, producers, contributors, playing times, and the like of the moving pictures and are in a text form.

Such multimedia contents files are played by an image processing apparatus such as a computer, a digital television (TV), or a digital set-top box. The image processing apparatus includes a media play program for playing multimedia contents files. The media play program plays moving pictures and provides a menu displaying metadata of the multimedia contents files. As described above, the metadata is displayed through the menu of the media play program. Thus, a user must manipulate an input device such as a mouse, a key board, or a remote controller several times to refer to the metadata of the multimedia contents. As a result, the convenience of the user is diminished.

The menu of the media play program is equally applied to all types of multimedia contents and thus cannot provide individualized menus to the multimedia contents.

Also, the metadata provided by the multimedia contents is extremely limited and thus cannot provide various types of information related to the multimedia contents.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and an apparatus for playing multimedia contents by which individualized menus can be provided according to characteristics of the multimedia contents so as to improve service quality.

According to an aspect of the present invention, there is provided a method for playing multimedia contents, including if a multimedia contents file providing the multimedia contents is loaded, detecting contents menus for controlling the multimedia contents from the multimedia contents file and displaying the contents menus; and if a specific contents menu is selected from the contents menus, providing a contents service corresponding to the selected contents menu.

The detecting of the contents menus for controlling the multimedia contents from the multimedia contents file and displaying the contents menus may include if the multimedia contents file is loaded, determining whether the multimedia contents file comprises the contents menus; if the multimedia contents file comprises the contents menus, displaying the contents menus; and if the multimedia contents file does not comprise the contents menus, extracting image and sound data from the multimedia contents file and outputting an image and a sound.

The providing of the contents service corresponding to the selected contents menu may include if the selected contents menu is a menu for playing the image and the sound corresponding to the multimedia contents, playing the image and the sound; and if the selected contents menu is a menu for requesting information relating to the multimedia contents, extracting the information relating to the multimedia contents from the multimedia contents file and displaying the information.

The playing of the image and the sound may include if the multimedia contents file comprises image data corresponding to the image and sound data corresponding to the sound, detecting the image data and the sound data from the multimedia contents file and playing the image and the sound; and if the multimedia contents file does not comprise the image data corresponding to the image and the sound data corresponding to the sound, receiving the image data and the sound data from a contents providing apparatus providing the multimedia contents through a communication network and playing the image and the sound.

The providing of the contents service corresponding to the selected contents menu may further include if the selected contents menu is a menu for setting a play environment of a moving picture, displaying a picture for setting the play environment.

The providing of the contents service corresponding to the selected contents menu may further include if the selected contents menu is a menu for requesting a main still picture of the moving picture, displaying the main still picture of the moving picture.

The method may further include if the contents service is ended, re-displaying the contents menu.

According to another aspect of the present invention, there is provided an apparatus for playing multimedia contents, including a communicator which receives a multimedia contents file for providing the multimedia contents through a communication network; a menu processor which detects contents menus for controlling the multimedia contents from the multimedia contents file and which outputs the contents menus; a controller which controls the multimedia contents corresponding to a contents menu selected from the contents menus; an image processor which decodes and outputs image data corresponding to the multimedia contents and a contents service corresponding to the selected contents menu under control of the controller; and a sound processor which decodes and outputs sound data corresponding to the multimedia contents under control of the controller.

The multimedia contents file may include metadata including data for providing the contents menu and a contents service corresponding to the contents menu.

The multimedia contents file may further include the image data and the sound data.

The apparatus may further include an image display which receives the image data from the image processor, displays the image data, receives the contents menu from the menu processor, displays the contents menu, and displays metadata corresponding to the selected contents menu; and a sound output unit which receives the sound data from the sound processor and outputs a sound.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
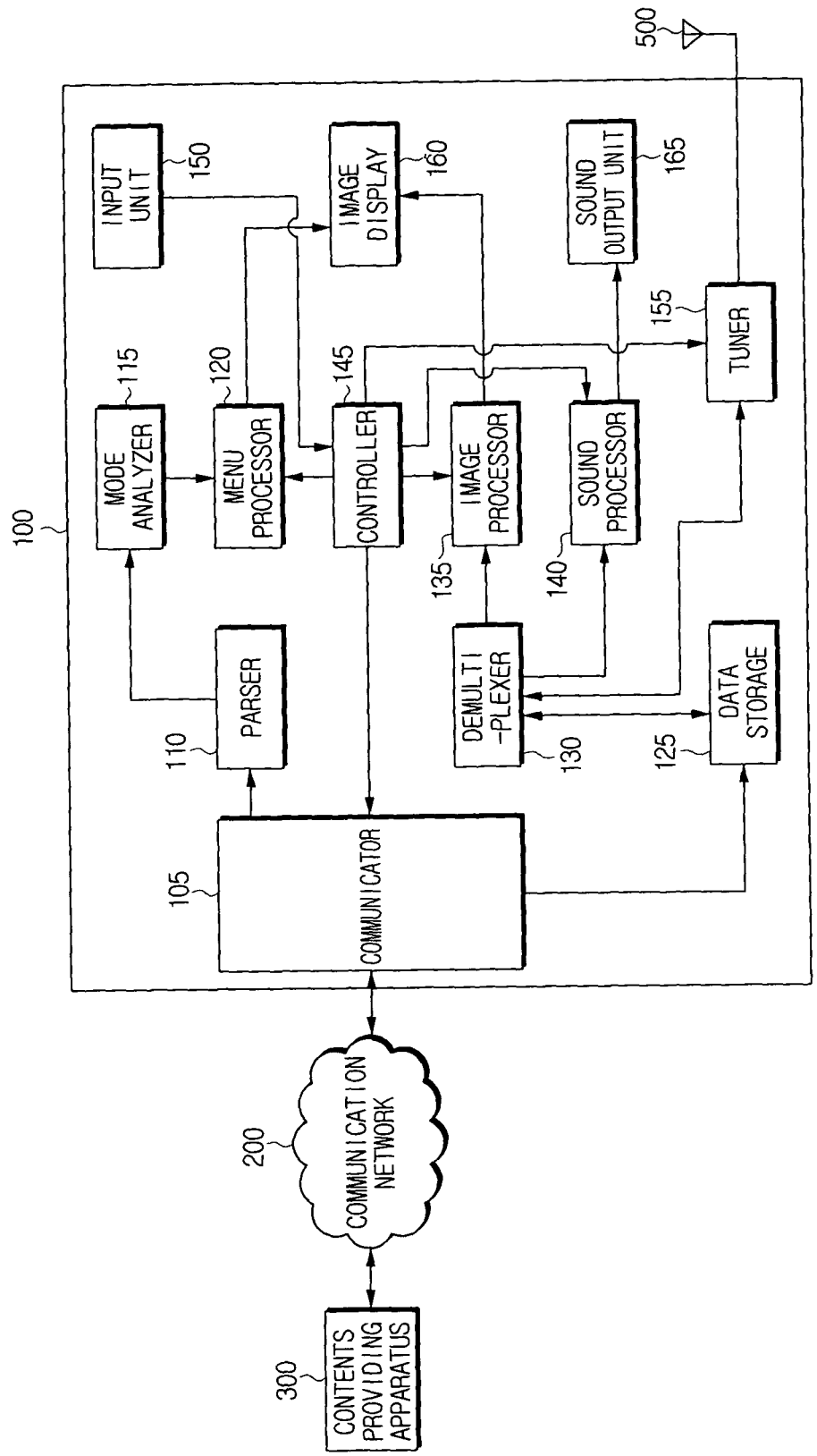
FIG. 1 is a block diagram of an apparatus for playing multimedia contents according to an exemplary embodiment of the present invention.

Certain exemplary embodiments of the present invention will be described in greater detail with reference to the accompanying drawings.

In the following description, the same drawing reference numerals are used for the same elements throughout the drawings. The matters defined in the description such as a detailed construction and elements are provided to assist in a comprehensive understanding of the invention. However, the present invention can be carried out in different manners. Also, well-known functions or constructions are not described in detail since they would obscure the invention in unnecessary detail.

Figure 2:
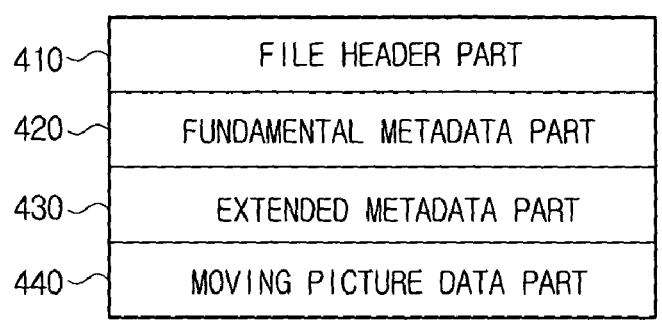
FIG. 2 is a block diagram of a structure of a multimedia contents file played by the apparatus shown in FIG. 1.

FIG. 1 is a block diagram of an apparatus for playing multimedia contents according to an exemplary embodiment of the present invention, and FIG. 2 is a block diagram of a structure of a multimedia contents file played by the apparatus shown in FIG. 1. Referring to FIGS. 1 and 2, a multimedia contents playing apparatus 100 includes a communicator 105, a demultiplexer 130, an image processor 135, a sound processor 140, and a controller 145.

The communicator 105 includes a communication protocol and is connected to a communication network 200 to transmit and/or receive data through the communication network 200. In particular, the communicator 105 receives a multimedia contents file 400 for a video on demand (VOD) service from a contents providing apparatus 300 connected to the communication network 200. Here, the multimedia contents file 400 may be provided in a download service form or a streaming service form. A download service provides moving pictures corresponding to multimedia contents after the multimedia contents file 400 is completely downloaded. A streaming service provides moving pictures corresponding to multimedia contents in real-time while downloading the multimedia contents file 400.

As shown in FIG. 2, the multimedia contents file 400 includes a file header part 410, a fundamental data part 420, an extended metadata part 430, and a moving picture data part 440.

The file header part 410 stores information indicating an Internet Protocol (IP) address of the contents providing apparatus 300 providing the multimedia contents file 400, an IP address of the multimedia contents playing apparatus 100, and starting points of the fundamental metadata part 420, the extended metadata part 430, and the moving picture data part 440.

The fundamental metadata part 420 includes metadata in a text form and includes brief information of the multimedia contents file 400, for example, a title, a producer, a copyrighter, a play time, and the like of a moving picture corresponding to the multimedia contents file 400.

The extended metadata part 430 stores metadata providing a contents menu for providing a contents service corresponding to the multimedia contents file 400. The contents service provides multimedia contents, i.e., detailed information corresponding to a moving picture, and a service for tuning output environments of the multimedia contents according to a manipulation of a user. Here, the contents menu will be described later in detail with reference to FIGS. 3 and 4.

In the present exemplary embodiment, the multimedia contents file 400 forms a single body together with the extended metadata part 430. Alternatively, the extended metadata part 430 may be separated from the multimedia contents file 400 depending on a service method of the multimedia contents. In a case where the extended metadata part 430 is separated from the multimedia contents file 400, a plurality of extended metadata parts corresponding to a plurality of types of multimedia contents may be formed as one file. As described above, a file including only an extended metadata part may be used as a public information file for multimedia contents.

The moving picture data part 440 stores substantial data for playing moving pictures.

The communicator 105 receives the multimedia contents file 400 from the contents providing apparatus 300 and provides the multimedia contents file 400 to a parser 110 and a data storage 125.

The parser 110 detects metadata from the fundamental metadata part 420 and the extended metadata part 430 of the multimedia contents file 400, parses the detected metadata, and provides the parsed metadata to the mode analyzer 115.

The mode analyzer 115 determines whether the metadata received from the parser 110 includes a contents menu. If it is determined that the metadata includes the contents menu, the mode analyzer 115 detects the contents menu and provides the contents menu to a menu processor 120. Thus, the multimedia contents playing apparatus 100 drives multimedia contents through the contents menu. A mode in which the multimedia contents playing apparatus 100 drives the multimedia contents through the contents menu, as described above, is referred to as a navigation mode.

If it is determined that the metadata does not include the contents menu, the mode analyzer 115 transmits a menu nonexistence signal indicating a nonexistence of the contents menu to the controller 145 so as to immediately play moving pictures corresponding to the multimedia contents file 400. Thus, the multimedia contents playing apparatus 100 drives multimedia contents through a menu supported by a media play program playing moving pictures. A mode in which the multimedia contents playing apparatus 100 drives the multimedia contents through the menu supported by the media play program is called a play mode.

The data storage 125 stores data necessary for driving the multimedia contents playing apparatus 100 and data received from an external source. In other words, the data storage 125 receives the multimedia contents file 400 from the communicator 105, stores the multimedia contents file 400, and provides the multimedia contents file 400 to the demultiplexer 130. The data storage 125 also stores the media play program.

The demultiplexer 130 receives the multimedia contents file 400 from the data storage 125. The demultiplexer 130 divides the multimedia contents file 400 into image data and sound data and outputs the image and sound data. The image data is provided to the image processor 135, and the sound data is provided to the sound processor 140.

The image processor 135 decodes and outputs the image data, and the sound processor 140 decodes and outputs the sound data.

If the multimedia contents file 400 is received, the controller 145 executes the media play program stored in the data storage 125. The controller 145 determines whether the multimedia contents file 400 operates in the navigation mode or the play mode according to the signal received from the mode analyzer 115 and controls driving of multimedia contents in the corresponding mode.

The multimedia contents playing apparatus 100 further includes an input unit 150 generating an input command according to a manipulation of a user. The input unit 150 generates the input command according to the manipulation of the user and provides the input command to the controller 145, and the controller 145 outputs a control signal to control elements of the multimedia contents playing apparatus 100 according to the input command.

The multimedia contents playing apparatus 100 further includes a tuner 155 connected to an antenna 500 to receive a broadcast signal. The tuner 155 selects an input channel under control of the controller 145 and provides the broadcast signal received from a channel set as the input channel through the antenna 500 to the demultiplexer 130. The demultiplexer 130 divides the broadcast signal received from the tuner 155 into image and sound data and outputs the image and sound data.

The multimedia contents playing apparatus 100 further includes an image display 160 and a sound output unit 165. The image display 160 receives the image data from the image processor 135 to display an image. The image display 160 also receives the contents menu from the menu processor 120 to display the contents menu. The sound output unit 165 receives the sound data from the sound processor 140 and outputs a sound.

As described above, the multimedia contents playing apparatus 100 according to the exemplary embodiment drives multimedia contents through the contents menu supported by the multimedia contents file 400. Thus, the multimedia contents playing apparatus 100 can provide contents services suitable for the characteristics of multimedia contents and be easily manipulated by the user. As a result, the multimedia contents playing apparatus 100 can improve service quality and convenience of the user.

The multimedia contents playing apparatus 100 can variously provide detailed information related to the multimedia contents not simple information and thus improve the service quality.

Figure 3:
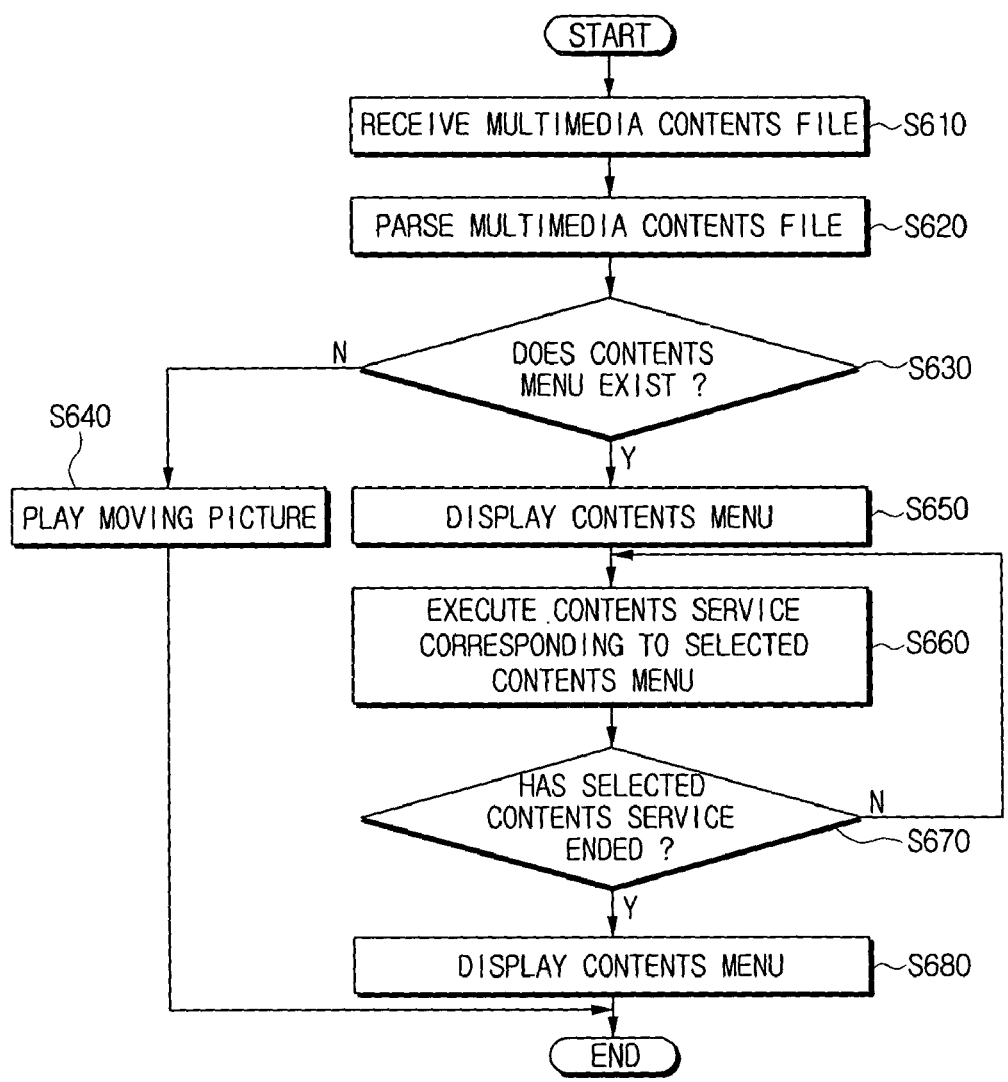
FIG. 3 is a flowchart of a method for playing multimedia contents according to an exemplary embodiment of the present invention.

FIG. 3 is a flowchart of a method for playing multimedia contents according to an exemplary embodiment of the present invention. Referring to FIGS. 1 through 3, in operation S610, the communicator 145 receives the multimedia contents file 400 from the contents providing apparatus 300 through the communication network 200 under control of the controller 145 and provides the multimedia contents file 400 to the parser 110 and the data storage 130.

In operation S620, the parser 110 detects the metadata from the fundamental data part 420 and the extended metadata part 430 of the multimedia contents file 400, parses the metadata, and provides the parsing result to the mode analyzer 115. Here, if the multimedia contents file 400 is driven in the play mode, the multimedia contents playing apparatus 100 does not include the extended metadata part 430.

In operation S630, the analyzer 115 determines whether the multimedia contents file 400 includes the extended metadata part 430.

If the analyzer 115 determines that the multimedia contents file 400 does not include the extended metadata part 430 in operation S630, the mode analyzer 115 transmits the menu nonexistence signal indicating that the multimedia contents file 400 is driven in the play mode to the controller 145. In operation S640, the controller 145 drives the media play program stored in the data storage 125, and the image display 160 and the sound output unit 165 respectively output a moving picture and a sound corresponding to the multimedia contents file 400. Thus, the multimedia contents playing apparatus 100 is driven in the play mode in which multimedia contents are controlled through only the menu supported by the media play program.

If the analyzer determines that the multimedia contents file 400 includes the extended metadata part 430 in operation S630, the mode analyzer 115 provides the metadata detected from the extended metadata part 430 to the menu processor 120. The menu processor 120 generates and outputs the contents menu for providing the contents service using the metadata. In operation S650, the image display 160 receives the contents menu from the menu processor 120 and displays the contents menu. As a result, the multimedia contents playing apparatus 100 is driven in the navigation mode in which the multimedia contents are controlled through the contents menu.

Figure 4:
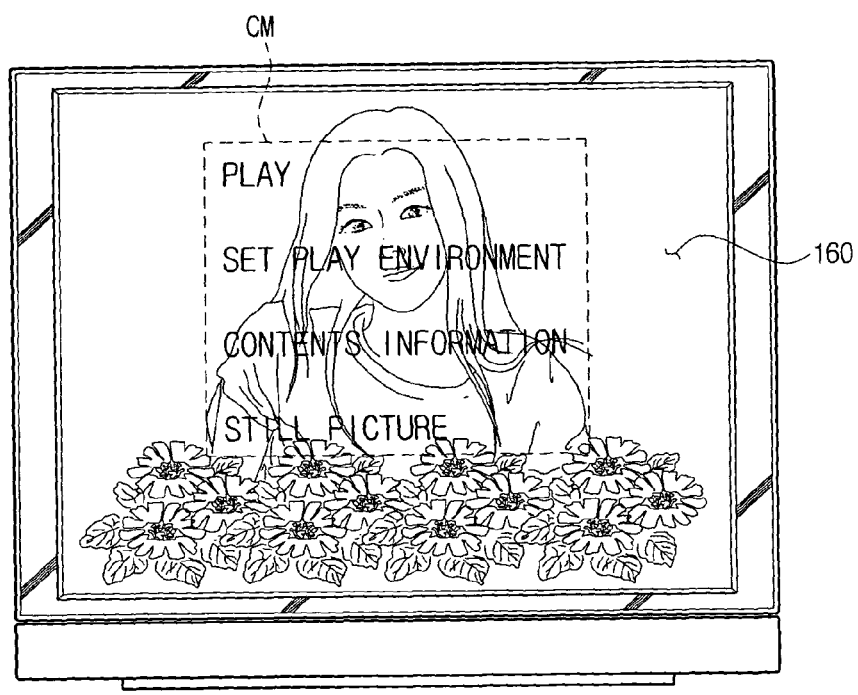
FIG. 4 is a view illustrating a contents menu picture displayed by an image display shown in FIG. 1 according to an exemplary embodiment of the present invention.

FIG. 4 is a view illustrating a contents menu picture displayed by the image display 160 shown in FIG. 1 according to an exemplary embodiment of the present invention. Referring to FIG. 4, a contents menu (CM) displayed on the image display 160 includes a play menu playing a moving picture, a play environment setting menu tuning an output environment of multimedia contents, a contents information menu indicating detailed information relating to the moving picture, and a still picture menu displaying important still pictures of the moving picture. Here, the CM may include various menus according to an intention of a contents provider providing multimedia contents or a moving picture producer.

The play menu outputs a moving picture and a sound corresponding to the multimedia contents file 400 shown in FIG. 2.

The play environment setting menu provides a menu setting a picture size of a moving picture, a picture quality, a language for outputting subtitles, and the like, according to a selection of a user during playing of multimedia contents. For example, if Korean and English are supported for the subtitles of the moving picture in the multimedia contents, the subtitles are output in a language selected through the play environment setting menu.

The contents information menu displays a title, a plot, a producer, characters, information corresponding to the intentions of the producer, descriptions of the characters, and the like of the moving picture and supports a preview previewing a part of the moving picture and the like.

The still picture menu displays the important still pictures of the moving picture or still pictures showing a process of producing the moving picture.

Referring to FIGS. 1 and 3, if a specific contents menu is selected on the CM shown in FIG. 4 by a manipulation of the user, a contents service corresponding to the selected contents menu is provided in operation S660. A process of providing the contents service will be described later in detail with reference to FIG. 5.

In operation S670, the controller 145 determines whether the selected contents service is ended. If the controller 145 determines that the contents service is not ended in S670, the controller 145 maintains a current state, i.e., repeats operation S660.

If the controller 145 determines that the contents service is ended in operation S670, the controller 145 controls the menu processor 120 to display the CM, and the image display 160 displays the CM in operation S680.

As described above, the multimedia contents playing apparatus 100 according to the present invention controls multimedia contents through a contents menu supported by the multimedia contents file 400. As a result, the multimedia contents playing apparatus 100 can be easily manipulated by a user during playing of multimedia contents and thus improve convenience of the user.

Figure 5:
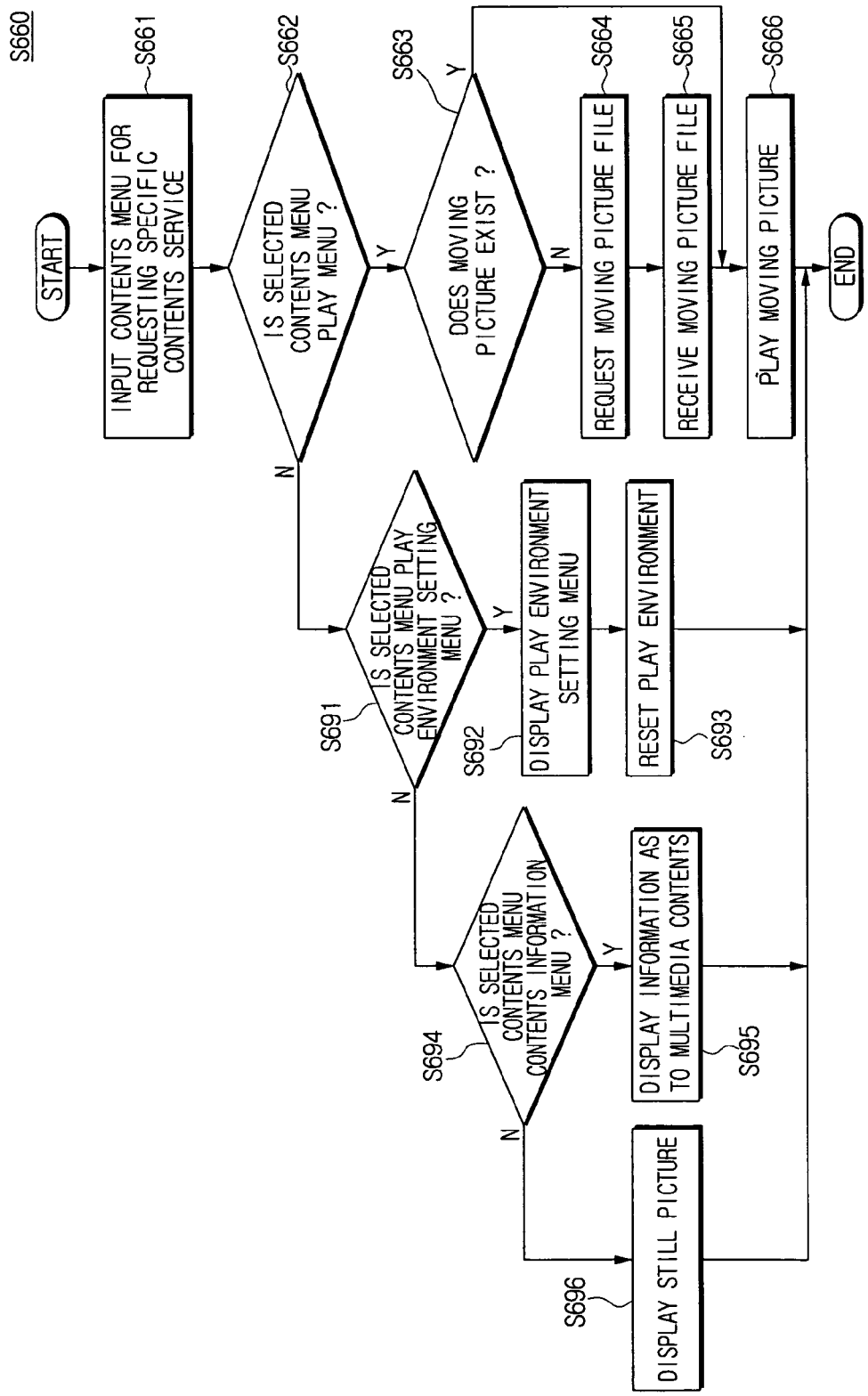
FIG. 5 is a flowchart of a process of providing a contents service shown in FIG. 3.

FIG. 5 is a flowchart of a process of providing the contents service shown in FIG. 3. Referring to FIGS. 1 and 5, in operation S661, the controller 145 receives a contents menu requesting a specific contents service by a manipulation of a user.

In operation S662, the controller 145 determines whether the contents menu is a play menu. If the controller 145 determines that the contents menu is the play menu in operation S662, the controller 145 determines whether the multimedia contents file 400 shown in FIG. 2 includes the moving picture data part 440 shown in FIG. 2 in operation S663.

If the controller 145 determines that the multimedia contents file 400 does not include the moving picture data part 440 in operation S663, the controller 145 requests a moving picture file corresponding to the multimedia contents file 400 of the contents providing apparatus 300 in operation S664.

In operation S665, the communicator 105 receives the moving picture file 400 from the contents providing apparatus 300 and provides the moving picture file 400 to the demultiplexer 130. In operation S666, the demultiplexer 130 divides the moving picture file into image and sound data and provides the image and sound data to the image processor 135 and the sound processor 140, and the image display 160 and the sound output unit 165 output a moving picture and a sound corresponding to multimedia contents.

If the controller 145 determines that the multimedia contents file 400 includes the moving picture data part 440 in operation S663, the demultiplexer 130 detects data from the moving picture data part 440 of the multimedia contents file 400 to divide the data into image and sound data and provides the image and sound data to the image processor 135 and the sound processor 140. In operation S666, the image display 160 and the sound output unit 165 output a moving picture and a sound corresponding to multimedia contents.

If the controller 145 determines that the selected contents menu is not the play menu in operation S662, the controller 145 determines whether the selected contents menu is a play environment setting menu in operation S691.

If the controller 145 determines that the selected contents menu is the play environment setting menu in operation S691, the play environment setting menu in which a moving picture play environment is set by a manipulation of the user is displayed in operation S692.

In operation S693, the controller 145 resets the moving picture play environment according to a set value input through the play environment setting picture.

If the controller 145 determines that the selected contents menu is not the play environment setting menu in operation S691, the controller 145 determines whether the selected contents menu is a contents information menu in operation S694.

If the controller 145 determines that the selected contents menu is the contents information menu in operation S694, the controller 145 detects metadata indicating information relating to the multimedia contents from the extended metadata part 430 of the multimedia contents file 400 and provides the detected metadata to the image processor 135, and the image processor 135 decodes the metadata and provides the metadata to the image display 160. In operation S695, the image display 160 displays detailed information corresponding to the multimedia contents.

If the controller 145 determines that the selected contents menu is not the contents information menu but a still picture menu in operation S694, the image display 160 displays important still pictures of the moving picture.

As described above, the multimedia contents playing apparatus 100 according to the present invention controls multimedia contents through a contents menu generated for each type of multimedia contents in consideration of characteristics of each type of multimedia contents. Thus, the multimedia contents playing apparatus 100 can provide a contents service suitable for the characteristics of the each type of multimedia contents and thus improve service quality.

As described above, according to the present invention, a multimedia contents playing apparatus can control multimedia contents through a contents menu provided by a multimedia contents file. The contents menu can be formed for each type of multimedia content and thus be constituted to be suitable for characteristics of corresponding multimedia contents. Thus, the multimedia contents playing apparatus can provide various services suitable for each type of multimedia content during the offering of multimedia contents and thus improve service quality.

Also, a user can manipulate the multimedia contents using the contents menu while using the multimedia contents. Thus, the multimedia contents playing apparatus can improve the convenience of the user.

In addition, the multimedia contents playing apparatus can provide various detailed information relating to the multimedia contents and thus improve the quality of service.

The foregoing exemplary embodiment and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, as many alternatives, modifications, and variations will be apparent to those skilled in the art.

What is claimed is:

1. An apparatus, embodied on a hardware platform, for playing multimedia contents, the apparatus comprising:
a mode analyzer which determines whether a multimedia contents file providing the multimedia contents comprises contents menus for controlling the multimedia contents;
a menu processor which detects the contents menus from the multimedia contents file and outputs the contents menus for a display if it is determined, by the mode analyzer, that the multimedia contents file comprises the contents menus;

a controller which controls the multimedia contents corresponding to a contents menu selected from the contents menus;

an image processor which decodes and outputs image data corresponding to the multimedia contents and a contents service corresponding to the selected contents menu under control of the controller; and a sound processor which decodes and outputs sound data corresponding to the multimedia contents under control of the controller, wherein, if it is determined, by the mode analyzer, that the multimedia contents file does not comprise the contents menus, the image data and the sound data are extracted from the multimedia contents file, and provided to the image processor and the sound processor, respectively.

2. The apparatus of claim 1, further comprising a communicator which receives the multimedia contents file providing the multimedia contents through a communication network.

3. The apparatus of claim 1, wherein the multimedia contents file comprises metadata comprising data for providing the contents menu and a contents service corresponding to the contents menu.

4. The apparatus of claim 3, wherein the multimedia contents file further comprises the image data and the sound data.

5. The apparatus of claim 1, further comprising:

an image display which receives the image data from the image processor, displays the image data, receives the contents menu from the menu processor, displays the contents menu, and displays metadata corresponding to the selected contents menu; and a sound output unit which receives the sound data from the sound processor and outputs a sound.

6. The apparatus of claim 3, further comprising a parser which detects the metadata, parses the detected metadata, and provides the parsed metadata to the mode analyzer.

7. The apparatus of claim 6, wherein the mode analyzer determines whether the metadata received from the parser includes the contents menu, and if the metadata received from the parser includes the contents menu, provides the contents menu to the menu processor.

8. The apparatus of claim 1, wherein the contents menus comprise at least two of:

a play menu which facilitates playing an image and a sound corresponding to the multimedia contents;

a contents information menu which facilitates requesting information relating to the multimedia contents which contents information menu comprises at least one of:
  a menu for providing information related to a producer of a moving picture,
  a menu for providing information related to a director of a moving picture, and
  a menu for providing information related to characters of a moving picture;

a play environment setting menu which facilitates setting a play environment of the moving picture which play environment setting menu comprises at least one of:
  a menu for setting a picture size of the moving picture,
  a menu for setting a picture quality of the moving picture, and
  a menu for setting a language for subtitles; and a still picture request menu which facilitates requesting a still picture related to one of an important scene of the moving picture and a picture depicting a process of making a scene of the moving picture.

9. A method for playing multimedia contents, the method comprising:

detecting contents menus for controlling multimedia contents from a multimedia contents file providing the multimedia contents and displaying the contents menus; and if a specific contents menu is selected from the contents menus, providing a contents service corresponding to the selected contents menu, wherein the detecting of the contents menus for controlling the multimedia contents from the multimedia contents file and displaying the contents menus comprises:

determining whether the multimedia contents file comprises the contents menus;

if it is determined that the multimedia contents file comprises the contents menus, displaying the contents menus; and if it is determined that the multimedia contents file does not comprise the contents menus, extracting image and sound data from the multimedia contents file and outputting an image and a sound.

10. The method of claim 9, wherein the providing of the contents service corresponding to the selected contents menu comprises:

if the selected contents menu is a play menu for playing an image and a sound corresponding to the multimedia contents, playing the image and the sound; and if the selected contents menu is a request menu for requesting information relating to the multimedia contents, extracting the information relating to the multimedia contents from the multimedia contents file and displaying the information.

11. The method of claim 10, wherein the playing of the image and the sound comprises:

if the multimedia contents file comprises image data corresponding to the image and sound data corresponding to the sound, detecting the image data and the sound data from the multimedia contents file and playing the image and the sound; and if the multimedia contents file comprises something other than the image data corresponding to the image and the sound data corresponding to the sound, receiving the image data and the sound data from a contents providing apparatus providing the multimedia contents through a communication network and playing the image and the sound.

12. The method of claim 10, wherein the providing of the contents service corresponding to the selected contents menu further comprises if the selected contents menu comprises a play environment setting menu for setting a play environment of a moving picture, displaying a picture for setting the play environment.

13. The method of claim 10, wherein the providing of the contents service corresponding to the selected contents menu further comprises, if the selected contents menu is a still picture request menu for requesting a still picture of the moving picture, displaying the still picture of the moving picture.

14. The method of claim 9, further comprising, if the contents service has ended, re-displaying the contents menu.

15. The method of claim 9, wherein the multimedia contents file comprises metadata comprising data for providing the contents menu and a contents service corresponding to the contents menu.

16. A method for playing multimedia contents, the method comprising:

receiving a multimedia contents file;

detecting contents menus, which control multimedia contents, in the received multimedia contents file;
displaying the detected contents menus;
receiving a selection of a specific contents menu; and
providing a contents service corresponding to the specific contents menu,
wherein the detecting comprises:
detecting an absence of the contents menus in the multimedia contents file;
transmitting a menu nonexistence signal;
extracting image and sound data from the received multimedia contents file based on the transmitted menu nonexistence signal; and
outputting an image and a sound.

17. The method of claim 16, wherein the contents menus comprise at least two of:
  a play menu which facilitates playing an image and a sound corresponding to the multimedia contents;
  a contents information menu which facilitates requesting information relating to the multimedia contents which contents information menu comprises at least one of:
    a menu for providing information related to a producer of a moving picture,
    a menu for providing information related to a director of a moving picture, and
    a menu for providing information related to characters of a moving picture;
  a play environment setting menu which facilitates setting a play environment of the moving picture which play environment setting menu comprises at least one of:
    a menu for setting a picture size of the moving picture,
    a menu for setting a picture quality of the moving picture, and
    a menu for setting a language for subtitles; and
  a still picture request menu which facilitates requesting a still picture related to one of an important scene of the moving picture and a picture depicting a process of making a scene of the moving picture.

* * * * *